Nov. 11, 1969 J. E. LASCHENSKI 3,477,726

CHANGER MECHANISM FOR RECORD TAPE CARTRIDGE

Filed May 23, 1968 2 Sheets-Sheet 1

INVENTOR.
JOSEPH E. LASCHENSKI

BY

Harry W. Hargis III

AGENT

Nov. 11, 1969 J. E. LASCHENSKI 3,477,726

CHANGER MECHANISM FOR RECORD TAPE CARTRIDGE

Filed May 23, 1968 2 Sheets-Sheet 2

INVENTOR.
JOSEPH E. LASCHENSKI
BY
Harry W. Hargis III
AGENT

1

3,477,726

CHANGER MECHANISM FOR RECORD TAPE CARTRIDGE

Joseph E. Laschenski, Philadelphia, Pa., assignor to Philco-Ford Corporation, Philadelphia, Pa., a corporation of Delaware Filed May 23, 1968, Ser. No. 731,502
Int. Cl. B65h *1/00*
U.S. Cl. 274—4 13 Claims

ABSTRACT OF THE DISCLOSURE

Magnetic tape cartridge changer mechanism for use in magnetic tape sound reproducing apparatus. A changer mechanism accepts a pair of stacks of tape cartridges and automatically moves them in recirculating sequence to provide a continuous record program. A first stack of cartridges is fed vertically for sequential presentation at a sound reproducing head. After the tape cartridge has been played the mechanism operates to slide the cartridge laterally and beneath a second stack of cartridges, and to feed a cartridge from the top of the second stack onto the top of the first stack. The lowermost cartridge in the first stack then drops and is presented for engagement with the sound reproducing head.

BACKGROUND OF THE INVENTION

This invention relates to record tape handling apparatus, and more particularly to means for automatically feeding and storing a plurality of tape cartridges in predetermined sequence.

Tape handling means including apparatus for feeding tape cartridges to recording and playing heads from stored positions have been provided in the past. For example, apparatus has been provided that feeds a stack of tape cartridges, sequentially, until the stack is exhausted. In order to repeat playing of the cartridges, it is necessary manually to rearrange the stack. It is a general objective of this invention to provide improved tape handling means that affords, automatically, continuous, sequential feeding of stacked tape cartridges, thereby obviating sequential feeding of stacked tape cartridges, thereby obviating the need for manually rearranging the cartridges.

SUMMARY OF THE INVENTION

In achievement of the above-stated general objective, a preferred embodiment of the invention comprises automatically operable record tape handling apparatus including means for establishing a pair of adjacent stacks of tape cartridges, and sound reproducing head means positioned and adapted to engage an play the tape of the lowermost cartridge in one of the stacks. In especial accordance with the invention, means is provided for sliding a spent cartridge from its playing position to a position beneath the cartridges of the other stack, for feeding the upper cartridge of the last recited other stack onto the top of the one stack, and for dropping the next lower cartridge of the one stack into position for playing.

Advantageously, an operator of the apparatus need only insert the tape cartridges into the means for establishing the pair of stacks, after which the apparatus is operable automatically to present a cartridge for engagement of its tape by the sound reproducing head.

For a complete understanding of the invention, and the preferred manner of achieving its objectives and advantages, reference is made to the following description, taken in light of the accompanying drawing.

2

Figures 1, 2, 3:
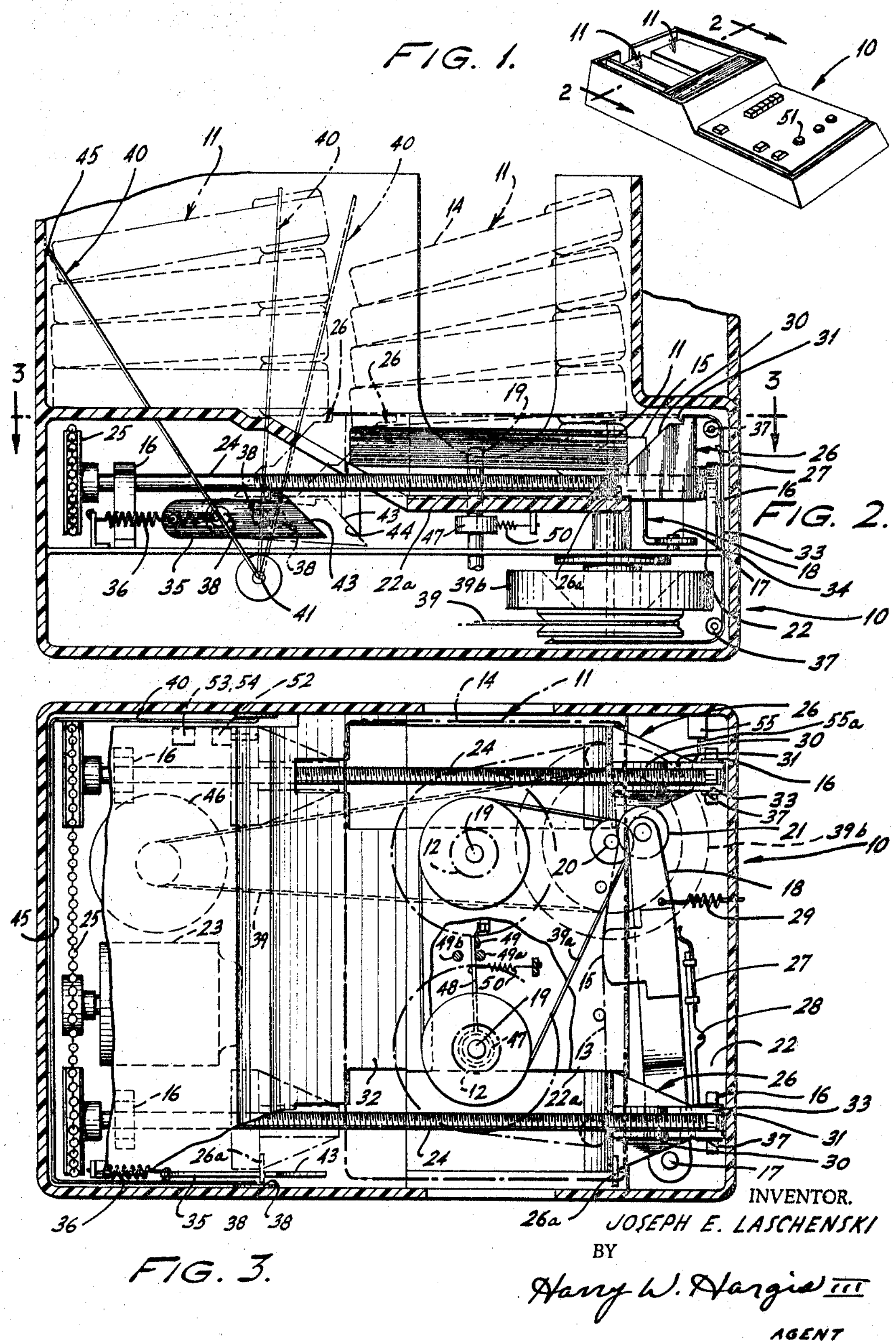
FIGURE 1 is a perspective showing, on a reduced scale, of tape handling apparatus embodying the invention.
Figure 9:
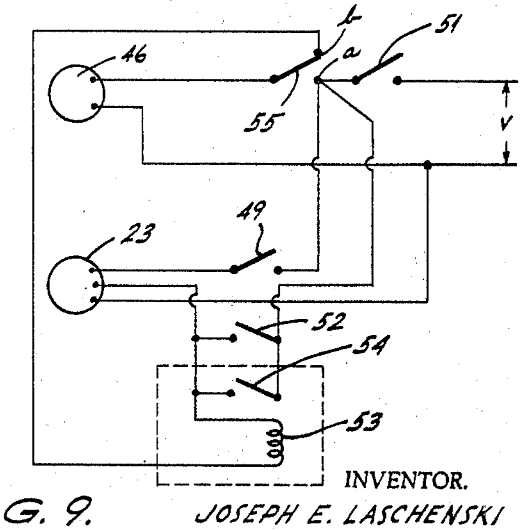

FIGURE 2 is an elevational showing, partly in section, of a portion of the apparatus seen looking in the direction of arrows 2—2 applied to FIGURE 1, but on a larger scale, and illustrating operational features of the invention;

FIGURE 3 is a plan view of apparatus seen in FIGURE 2, with some parts removed for the sake of convenience of illustration;

FIGURES 4 to 8 are somewhat diagrammatic figures illustrating the sequence of operation of apparatus embodying the invention; and FIGURE 9 is a schematic showing of an electrical circuit which may be used with apparatus embodying the invention.

DESCRIPTION OF THE PREFERRED EMBODIMENT

With more detailed reference to the drawing, and first to FIGURES 1, 2, and 3, a combination tape recording-playing device 10 is constructed and operable to handle magnetic recording tape of the type contained in a cartridge 11 commonly known as a "cassette." As is known and appears in broken lines in FIGURE 3, such a cartridge 11 comprises a pair of spaced spools 12 for storing tape 13 driven from one spool to another on spindles 19. The tape and spools are housed within a casing 14, and tape 13 is threaded from one spool to another by way of apertures (not shown) provided along an edge of the casing and through which the tape is accessible to a suitably presented sound reproducing head 15, as well as to drive and pinch rollers 20 and 21, respectively, arranged to engage tape 13 and to drive the same past the head. Drive roller 20 and spindles 19 are driven by a conventional belt, pulley, an slip clutch arrangement 39, **39*a*, 39*b* energized by a motor 46**.

For reasons more fully explained below, head 15 and pinch roller 21 are carried by an arm 18 that is mounted for pivotal movements about a pin 17 on frame structure 22. Arm 18 is movable, by means to be described, between positions effecting engagement and disengagement between head 15 and tape 13 and between pinch roller 21 and tape 13. For convenience of illustration, arm 18 is shown in its tape-engaging position in FIGURE 3.

One of spindles 19 has a collar 47 frictionally engaged therewith and provided with an actuating arm 48 for a switch 49. A tension spring 50 carried by frame portion **22*a* forces arm 48 against a stop 49*a* closing switch 49 when spindles 19 are at rest, as will be the case when motor 46 is de-energized or when spindles 19 are prevented from turning by virtue of tape 13 having been played out completely from the supply spool (lower spool 12 in FIGURE 3). Energization of motor 46 drives the spindles in a counterclockwise direction, as viewed in FIGURE 3, so that the frictional drag between collar 47 and spindle 19 will be sufficient to drive the collar, and consequently arm 48, in the same direction against stop 49*b* thereby releasing switch 49** to seek its normally open position. The purpose of this arrangement will be more fully appreciated in connection with the ensuing description of additional structure and operation of the apparatus.

In particular accordance with the invention, apparatus is provided for handling stacked cartridges 11 automatically, and includes the frame structure 22, **22*a* having a base portion supporting a reversible motor 23 constructed and arranged to drive a pair of spaced, parallel screws 24 through a drive pulley and chain arrangement 25. With reference to FIGURES 3 and 9, motor 23 includes forward and reverse windings (not shown), the forward winding being connectable to a source of energy V by a line switch 51 and directional switch 49. The reverse winding is connected to V by line switch 51 and a plunger actuated switch 52 in series with a current relay coil 53**, contact *b* of lever actuated switch 55, and in parallel with relay switch 54. Considering the electrical circuit further, it will be appreciated that tape drive motor 46 is in series with source of energy V, line switch 51, and contact *a* of switch 55.

Each screw 24 is supported for rotation by a pair of bearings 16, and a follower or trunnion 26 is threaded on each screw for linear slidable movements across frame portion **22*a*** as the screw is turned.

Figure 4:
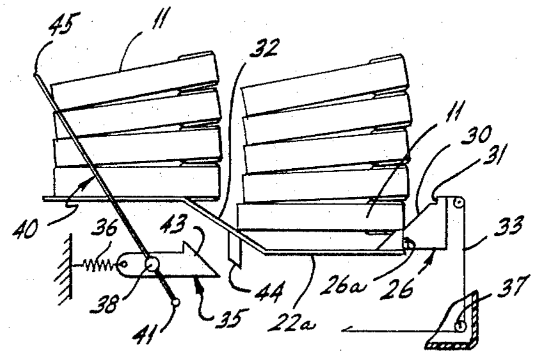
Figure 7:
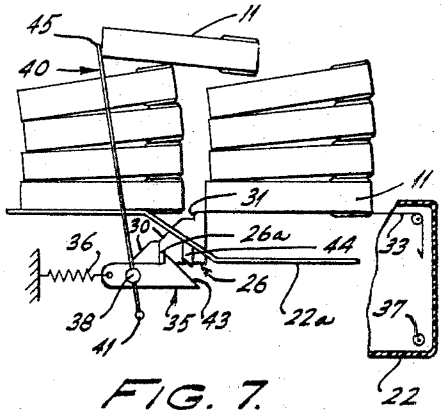
Figure 5:
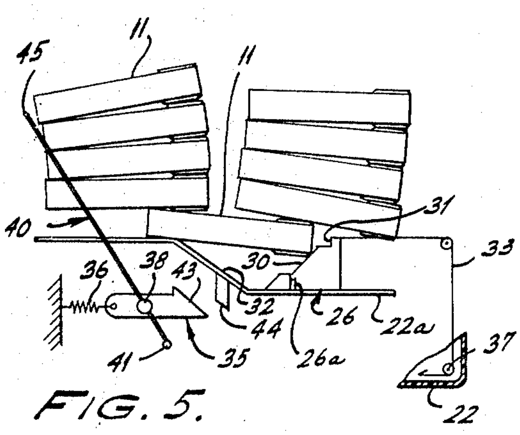
Figure 8:
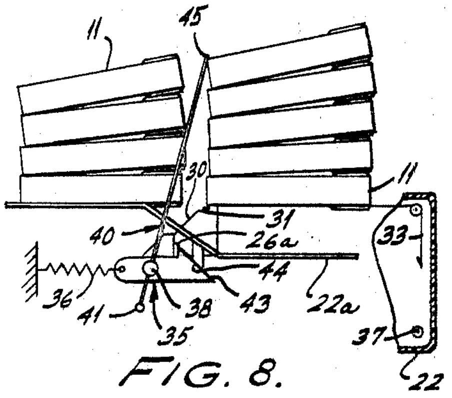

Further operational and structural features of apparatus embodying the invention will now be described, it being assumed that cartridges 11 are stacked in the positions shown in full and broken lines in FIGURES 3 and 4, that all other components are positioned as illustrated in full lines, and that it is desired to initiate playing of the cartridges. Switch 51 is closed manually, and in view of the face that switch 55 has its contact *a* closed because its arm **55*a* (FIGURE 3) is engaged by trunnion 26, motor 46 is energized and turns spindles 19 and drive roller 20 in a counterclockwise direction. This moves tape across head 15 to play or record as the case may be. Rotation of spindle 19 moves arm 48 to open switch 49. In addition, switches 52 and 54 are open, so that motor 23 is deenergized while the tape is being played. When the tape has played to its end, spindles 19 and roller 20 stop, permitting spring 50 to pull arm 48 and to close switch 49, thereby energizing motor 23 in its forward direction to turn screws 24. With reference also to FIGURES 4 to 8, as screws 24 are driven by the motor 23 turning in its forward direction, trunnions 26 are moved to the left (FIGURE 4) so that the played cartridge initially is forced to slide upwardly along the ramp portion 30 of each trunnion, and into engagement with an abutment 31** formed thereon. This initial movement of the trunnions is operable to open contact *a* and close contact *b* of switch 55 and to pivot arm 18 which carries the head 15 and the pinch roller 21, so that tape 13 is disengaged thereby, and motor 46 is deenergized. Pivotation of arm 18 (FIGURE 3) is effected by a lever arm 27 pivotal about a pivot pin 28, and having one end engaging arm 18 and its other end engaging trunnion 26. A tension spring 29 affixed to the frame 22 urges arm 18 against lever 27 and maintains engagement of the latter with trunnion 26 so long as it is in its full right-hand position.

Figure 6:
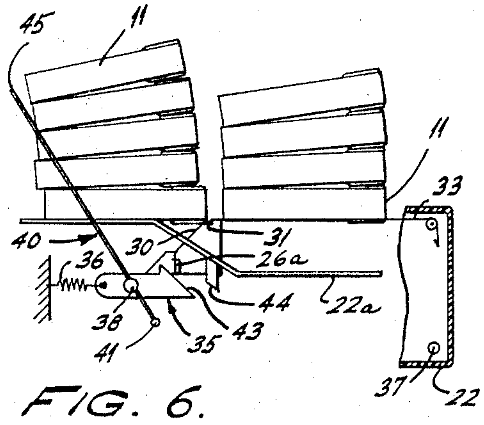

As the edge of cartridge 11 moves up ramp 30 of each trunnion (FIGURE 5) it also is disengaged from the deenergized drive roller 20 and spindles 19 by such upward movement. Continued movement of trunnions 26 translates cartridge 11 to the left up a ramp 32, moving the cartridge into such position as to force the lowermost cartridge of the other stack upwardly (FIGURES 5 and 6), thereby elevating that stack. Each trunnion 26 has affixed thereto a strip 33, such for example as "rule stock," that is extensible around guides 37 through slots 34 from a stored region in the lower portion of frame 22. Strips 33 are extended by movement of the trunnions to the left and serve to support the right hand stack of cartridges above the one cartridge that has just been moved (FIGURE 6).

As the cartridge is being moved to the left and beneath the other stack, one of trunnions 26 is moved into position in which a lateral extension **26*a* thereof engages a hook 35 (FIGURES 2, 3, and 6), which is loaded by a spring 36 toward the left-hand position illustrated. This same hook 35 is affixed by a pivot means 38 to a U-shaped wire frame 40 movable about a pivot 41 on frame 22 and having its loop portion 42 extending along an edge of the top, left hand cartridge 11. As the trunnion extension 26*a* and hook 35 interengage, the trunnion also engages plunger-actuated switch 52, closing the same to energize relay coil 53 and the reverse winding of motor 23. Energization of relay coil 53 closes relay switch 54, again energizing motor 46 to drive spindles 19 so that switch 49 will be opened to accommodate reverse drive of motor 23. With motor 23 reversed, trunnions 26 are moved to the opposite or right hand ends of screws 24 (FIGURES 7 and 8), thereby releasing switch 52 to open same. However, switch 54 is held closed by energized coil 53 in series therewith, thereby to maintain energization of motor 23 in its reverse sense. Since hook 35 is engaged by a trunnion 26 it is also moved to the right, causing the U-wire frame 40 to pivot about its lower pivot point 41. As wire frame 40 moves, its loop portion 43 is brought into engagement with the uppermost cartridge 11 in the left hand stack (FIGURE 7), causing it to slide onto the top of the right hand stack. As hook 35 is moved, a cam-like portion 43 is engaged by a fixed cam surface 44 on frame 22 so positioned as to cause hook 35 to rotate in a right hand direction about its pivot. This disengages hook 36 from trunnion 26, permitting spring 36 to return wire frame 40 to its rest position (FIGURE 4). As trunnions 26 are moved to the right (FIGURES 7 and 8) they retract the extensible strips 33, allowing the next cartridge 11 to fall into playing position as seen in FIGURES 2 and 4. Final movement of trunnions 26 pivots arm 18 so that reproducing head 15 is moved into engagement with tape 13. This same final movement of the trunnions 26 moves switch 55** to open its contact *b* and to close its contact *a*. This continues energization of motor 46 to drive spindles 19 and drive roller 20, thereby holding switch 49 open, and deenergizing motor 23 together with relay coil 53 to open switch 54. Tape 13 in the newly positioned cartridge plays to completion, and the cycle is repeated.

It will be appreciated that only such electrical circuitry has been described as is necessary for an understanding of the present invention. Accordingly no description will be undertaken of additional circuitry, and switches therefor, usually associated with cassette-type cartridge players. It will also be appreciated that the illustrated electrical circuitry is merely exemplary.

I claim:

1. In record tape handling apparatus: means for receiving tape cartridges in a pair of adjacent stacks, each stack containing a plurality of cartridges; means for engaging and playing the tape of a lowermost cartridge in one of the stacks; means for moving a spent cartridge from its playing position to a position beneath the cartridges of the other stack; means for moving the upper cartridge of said other stack onto the top of said one stack; and means providing for movement of the next lower cartridge of said one stack into position for playing.

2. Apparatus according to claim 1, and characterized in that said last means includes means operable to pivot such cartridge out of engagement by said means for playing, and thereafter to slide such cartridge beneath the cartridges of the recited other stack.

3. Apparatus according to claim 2, and further characterized in that said means operable to pivot and to slide said cartridge includes reciprocable means including a sloping face portion terminating in an abutment portion, said reciprocable means being translatable so that said cartridge is slidably engageable by said face portion to pivot said cartridge, and thereafter engageable by said abutment portion to slide said cartridge.

4. Apparatus according to claim 3, and further characterized by the inclusion of support means extensible and retractible in response to movements of said reciprocable means, said support means in its extended position being operable to support the recited one stack, and in its retracted position permitting said one stack of cartridges to move downwardly whereby the lowest cartridge is moved into position for playing.

5. Apparatus according to claim 4, and further characterized in that said support means comprises at least a pair of strips of flexible material, and guide means for storing the same in its retracted position, said strips being affixed to said reciprocable means.

6. Apparatus according to claim 3 and further characterized in that said means for engaging and playing the tape of the lowermost cartridge comprises a pivotally mounted arm movable substantially in the plane of said cartridge, said arm including a reproducing head and a pressure roller for engaging said tape at spaced suitable portions thereof, said arm being pivotal by said reciprocable means in one of its positions to move said head and roller into engagement with said tape, and pivotal by said reciprocable means in another of its positions to accommodate movement of said head and roller out of engagement with said tape.

7. Apparatus according to claim 3, and characterized further in that said means for moving the upper cartridge of the other stack onto the top of the one stack comprises pivotally mounted lever means releasably engageable by reciprocable means to pivot the same to engage and to urge said upper cartridge onto the top of the one stack, as said reciprocable means is moved away from said other stack of cartridges.

8. Apparatus according to claim 7, and characterized further in that said lever comprises a generally U-shaped member pivotal about its leg portions so that the loop portion thereof is positioned to engage the upper cartridge.

9. Apparatus according to claim 8 and characterized further that said lever includes a pivotal latch engageable by said reciprocable means to link the lever to the latter, and fixed cam means positioned for engagement with said latch to release the same and accommodate movement of said lever to a rest position.

10. Apparatus according to claim 9 and characterized further in that said lever is resiliently urged to said rest position.

11. Apparatus according to claim 2 and further characterized by the inclusion of support means for cartridges in the recited one stack, said support means being extensible and retractible in response to movements of said means operable to pivot and slide such cartridge, said support means in its extended position being operable to support the recited one stack, and in its retracted position permitting said one stack to move downwardly whereby the lowermost cartridge is moved into position for playing.

12. Apparatus according to claim 11 and further characterized in that said means for engaging and playing the tape of the lowermost cartridge comprises frame means reciprocably movable substantially in the plane of said cartridge, said frame means including a sound reproducing head and a pressure roller for engaging said tape at spaced suitable portions thereof, said frame means being movable to a retracted, tape disengaging position upon movement of said cartridge to the other stack, and movable to an extended, tape engaging position upon movement of a cartridge from said one stack to playing position.

13. Apparatus according to claim 11 and further characterized in that said support means comprises strip means movable between an extended, cartridge support position and a retracted, cartridge release position.

References Cited

UNITED STATES PATENTS

| | | |
|---|---|---|
| 3,326,483 | 6/1967 | Ivans. |
| 3,289,962 | 12/1966 | Gellenthin. |

LEONARD FORMAN, Primary Examiner

R. A. FIELDS, Assistant Examiner

U.S. Cl. X.R.

242—55.13